United States Patent [19]

Strasser

[11] Patent Number: 5,074,028

[45] Date of Patent: Dec. 24, 1991

[54] APPARATUS FOR THE INTRODUCTION OF A CYLINDRICAL TOOL HOLDER

[75] Inventor: Karl-Heinz Strasser, Berg b. Ravensburg, Fed. Rep. of Germany

[73] Assignee: Handtmann A-Punkt Automation GmbH, Baienfurt, Fed. Rep. of Germany

[21] Appl. No.: 575,320

[22] Filed: Aug. 30, 1990

[30] Foreign Application Priority Data

Sep. 30, 1989 [DE] Fed. Rep. of Germany ....... 3932826

[51] Int. Cl.$^5$ ............................................. B23Q 3/157
[52] U.S. Cl. ............................................. 29/568; 29/264
[58] Field of Search ....................... 29/568, 264; 408/35

[56] References Cited

U.S. PATENT DOCUMENTS

| | | | |
|---|---|---|---|
| 3,129,506 | 4/1964 | Hain | 29/568 |
| 3,344,511 | 10/1967 | Hosea | 29/568 |
| 3,431,635 | 3/1969 | Balding | 29/568 |
| 3,526,033 | 9/1970 | Saunders | 29/568 |
| 3,545,075 | 12/1970 | Ollearo | 29/568 |
| 4,761,877 | 8/1988 | Rupp | 29/568 |

Primary Examiner—Z. R. Bilinsky
Attorney, Agent, or Firm—Robert W. Becker & Associates

[57] ABSTRACT

An apparatus for the introduction of a cylindrical tool holder into a receiving bore, by using a feed gripping device, which holds the tool holder, comprises a gripping device, consisting of a contact plate and two clamp devices, which embrace the sides of the tool holder and are adjustable in the axial direction of the tool holder against the contact plate. The contact plate and the tool holder have contact surfaces, which oppose each other and are perpendicular to the receiving bore. The tool holder is held by the clamp devices in such a manner, so that the tool holder is slidable, to a limited extent, in the direction of the contact surface.

This embodiment allows the introduction of the tool holder into the receiving bore without exactly positioning the tool holder and without canting. The tool holder aligns itself with the receiving bore due to the slidable holder.

12 Claims, 5 Drawing Sheets

APPARATUS FOR THE INTRODUCTION OF A CYLINDRICAL TOOL HOLDER

Background of the Invention

The present invention relates to an apparatus for the introduction of a cylindrical workpiece into a receiving bore, for example, for the introduction of a tool holder, equipped with a cylindrical shaft, into the receiving bore of a machine spindle, a rotary tool magazine etc., by using a feed gripping device, which holds the tool holder.

The automatic introduction of cylindrical tool holder into receiving bores, into which the tool holder are clamped by screws or springs, is often very difficult. On the one hand, the fit of the parts, which are to be aligned, should be of very close tolerance to guarantee a connection free from play, and, on the other hand, an alignment of the tool holder with the receiving bore, exactly perpendicular to the axis and centered, is hard to achieve. When the tool holder is not aligned with the receiving bore at the moment of introduction, the tool holder is canted, resulting in damage to the workpiece and/or the receiving bore. At least, the introduction process has to be repeated. During tool changes, such introduction processes are unavoidable and occur frequently, necessitating a thorough surveillance. In spite of such precautions, shutdowns are almost inevitable.

It is therefore an object of the present invention to provide an apparatus for the introduction of a cylindrical tool holder into a receiving bore, with which a tool holder may be introduced into the receiving bore, without the need for the exact manual positioning of the tool holder with respect to the receiving bore and without canting.

The tool holder should align itself to the receiving bore, so that, even for fits with close tolerance, the introduction may be achieved reliably with little effort and without causing damage to the parts which are to be connected. The expenses for the construction of the apparatus should be low, but, at the same time, an operation free of shutdown, especially for the automated feed of tool holders, should be assured without special surveillance.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
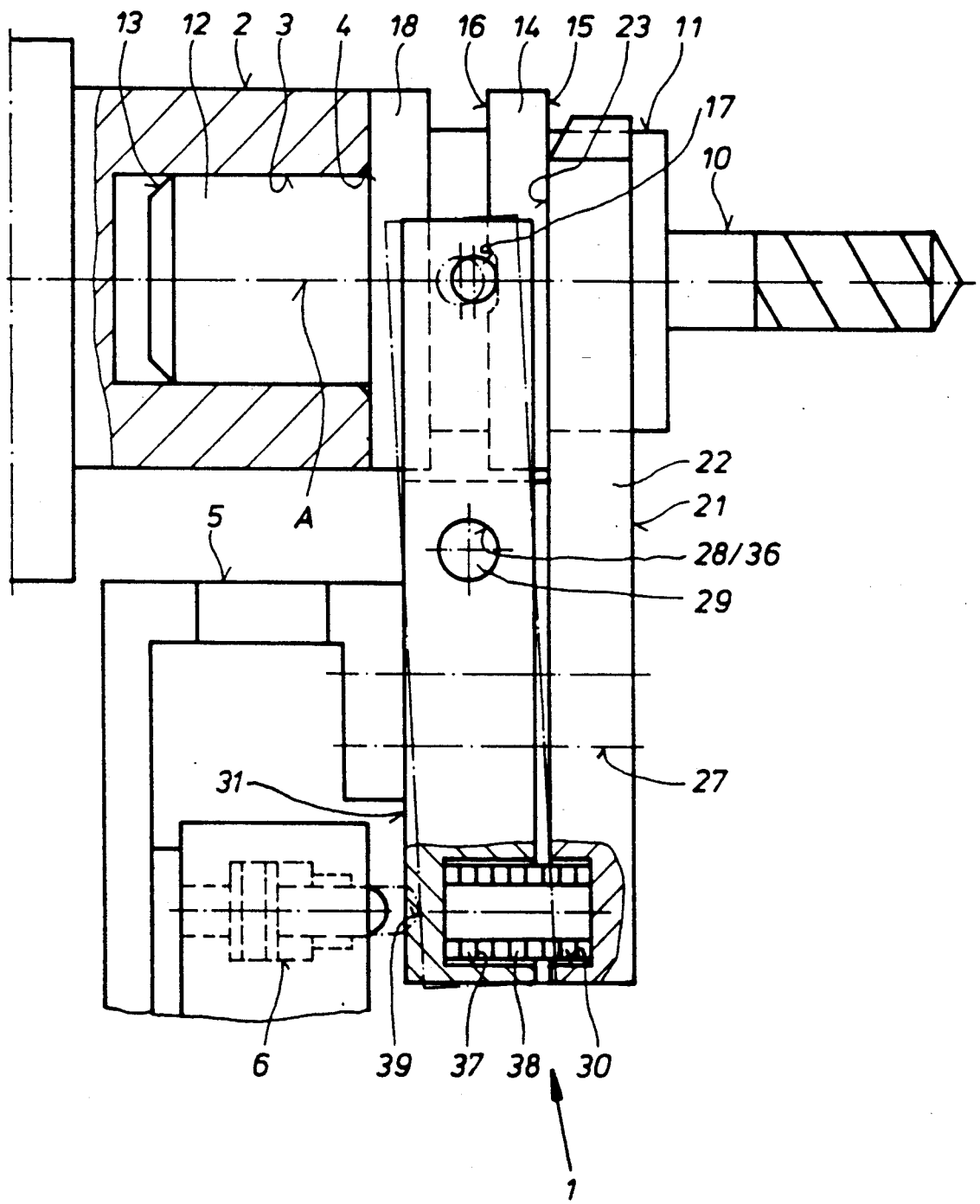
FIG. 1 is a side view and partsectional view of the apparatus.
Figure 2:
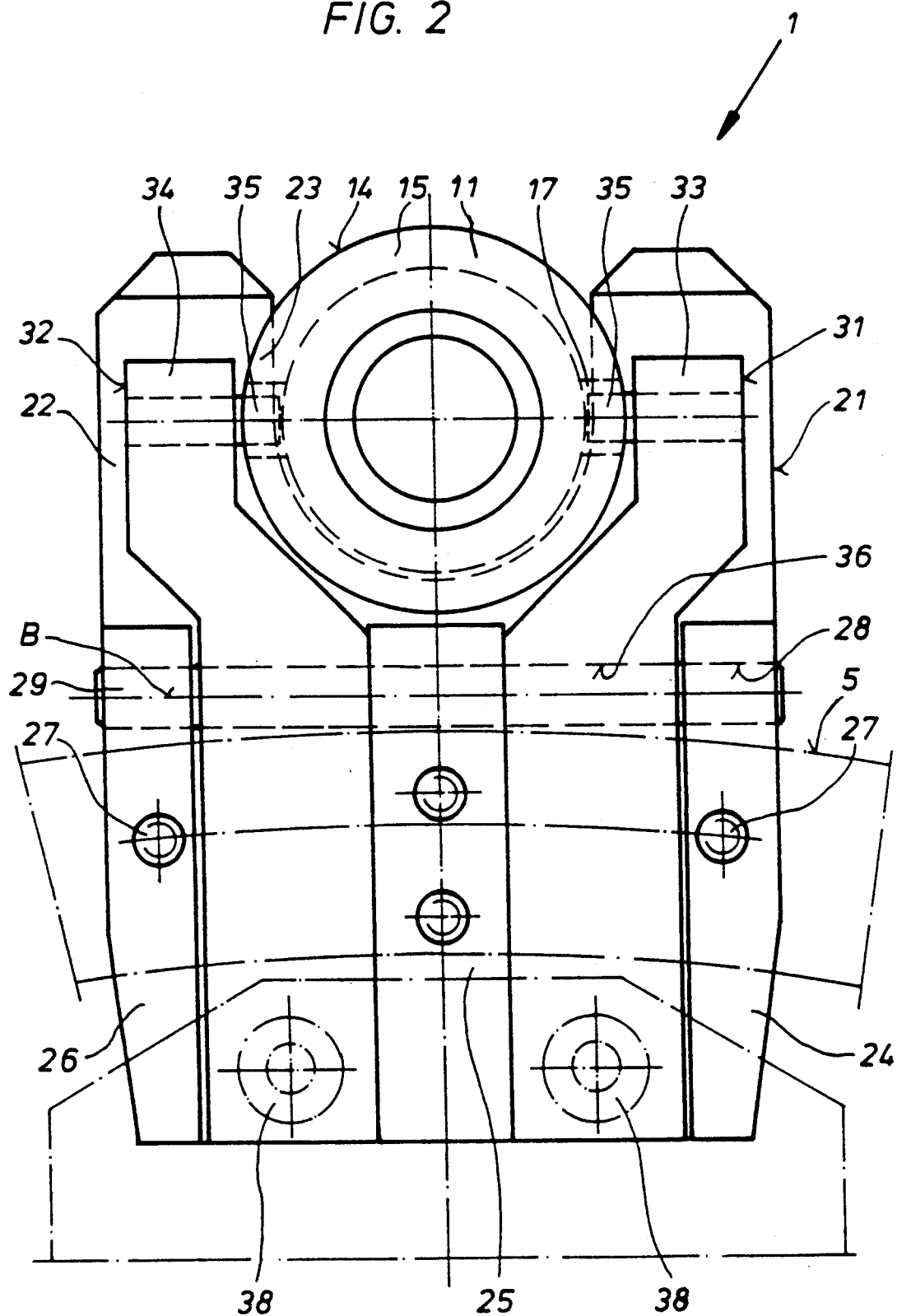
FIG. 2 is an end view of the apparatus according to FIG. 1 viewed from the left.

The apparatus of the present invention is characterized primarily by: a gripping device comprising a contact plate and two clamp devices, which partially embrace the sides of the tool holder partially and are adjustable in the direction of the tool holder to the contact plate; the contact plate and the tool holder having contact surfaces, which are facing each other and are perpendicular to the axis of the receiving bore; the tool holder being held by the clamp devices in such a manner, so that it may slide, to a limited extent, in the direction of the contact surface of the contact plate.

Therefore, it is suitable to have the contact surface of the tool holder built as an integral part of the tool holder in the form of a collar, by which the tool holder is clamped between the contact plate and the clamp devices of the gripping device. The clamp devices are supported by lugs, which are radially extending to the tool holder, against the face of the collar opposite the contact surface. In order to limit the sliding of the tool holder in the direction of the contact surface of the contact plate, notches, which engage the lugs and are parallel to the axis of the lugs, are formed into the face of the collar, which opposes the lugs.

The clamp devices of the gripping device comprise two levers, which pivot independently on a bolt inserted into the contact plate, along an axis perpendicular to the length of the levers. In order to clamp the tool holder at the face opposite the lugs, it is suitable to arrange at least one tension spring between the contact plate and the levers of the clamp devices.

In a further embodiment the clamp devices comprise two disks, which are arranged, opposing each other, on the sides of the tool holder and may be rotated within the contact plate. A lug, which is eccentric to the rotation axis of the disks and which interacts with the collar of the tool holder, is attached to each disk. Another embodiment comprises two tension bolts, which are arranged, opposing each other, on the sides of the tool holder and are attached in a slidable manner to the contact plate. At least one spring, supported by the contact plate, is acting on the bolts. The lugs, which are interacting with the collar of the tool holder, are also attached to the bolts.

In order to reduce friction, it is advantageous to equip the contact surface of the contact plate and/or the tool holder with a friction reducing means such as a rolling device, for example, in the form of roller balls inserted into the surface.

When an apparatus for the introduction of a cylindrical tool holder into a receiving bore is built according to the invention, it is possible, in a very simple and operation-safe manner, to introduce the tool holder into the receiving bore without canting it and without damaging the parts, which are to be connected. By clamping the tool holder into the gripping device with the clamp devices in such a manner, so that the tool holder is slidable in the direction of the contact surface of the contact plate, the tool holder is centered and aligned with the receiving bore by respective compulsory beveled edges at the tool holder and/or the receiving bore. Canting and damages caused thereby are reliably avoided, and the introduction of the tool holder is achieved with little effort.

The tool holder, therefore, does not have to be aligned exactly with the receiving bore, and a precentering is sufficient to assure an operation free of shutdown. The apparatus according to the invention is especially suited and advantageous for automated operations, for example, the changing of tool holders, since no special surveillance is required. Also, since only a few parts are needed for a self-adjusting tool holder, the manufacture of the apparatus is achieved economically.

DESCRIPTION OF PREFERRED EMBODIMENTS

The present invention will now be described in detail with the aid of three specific embodiments represented in the FIGS. 1 to 5.

The apparatus, shown in FIGS. 1 to 5 and labeled 1, 1' or 1", is used for the introduction of a cylindrical tool, for example, the introduction of a workpiece holder 11 equipped with a cylindrical shaft 12 into a receiving bore 3 of a machine spindle 2. The apparatus consists essentially of a gripping device 21, attached to a disk 5 of a rotary tool magazine. The tool holder 11, which holds the tool 10, is clamped into the gripping device 21. The gripping device 21, as shown in the embodiment of the FIGS. 1 to 5, comprises a contact plate 22 and clamp devices 31, 32 or 41 or 51, with which the tool holder 11 is clamped.

In order to achieve an exact introduction of the shaft 12 into the receiving bore 3, without canting the tool holder 11 and thereby causing damage to the shaft 12 and/or the machine spindle 2, the tool holder 11 is equipped with a collar or flange 14, serving as a contact surface 15, perpendicular to the longitudinal axis A of the tool holder 11. The contact plate 22 of the gripping device 21 is also equipped with a contact surface 23, against which the contact surface 15 of the tool holder 11 is pressed. Furthermore, the tool holder 11 is attached such that it may slide, to a limited extent, in the direction of the contact surface 23, so that, when the shaft 12 is introduced in a canted manner into the receiving bore 3, the tool holder 11 is centered due to the beveled edges 13 at the shaft 12 and beveled edges 4 at the receiving bore 3. The tool holder 11 is moved more or less inwards, outwards or to the side but is always pressed flush against the contact surface 23 of the contact plate 22, so that a tilting and canting inside the receiving bore 3 is impossible.

The contact plate 22 of the gripping device 21 has three ledges 24, 25 and 26, which are formed as an integral part of the contact plate 22 and which serve to attach the gripping device 21 with screws 27 to the disk 5 of the turret head. In the embodiment according to the FIGS. 1 to 3, the ledges 24, 25 and 26 are equipped with borings 28, into which a bolt 29 is inserted. The bolt 29 penetrates borings 36 present in the clamp devices 31 and 32, which are formed as levers 33 and 34. The levers 33 and 34 pivot along the axis B of the bolt 29, and, at the end pointing towards the workpiece holder 11, are equipped with a radially extending lug 35, which is pressed against the face 16, opposite the contact surface 15, of the collar 14.

To achieve the pressure contact between the lug 35 and the face 16, the ends of the levers 33 and 34, opposite the tool holder 11, are equipped with tension springs 38, which are inserted into pocket borings 30 of the contact plate 22 and into pocket borings 37 of the levers 33 and 34. The force of the tension springs 38 pivots the levers 33 and 34, thereby pressing the tool holder 11 against the contact surface 23 of the contact plate 22. However, the tool holder 11 may still be slid in the direction of the contact surface 23. To limit the sliding movement perpendicular to the axis, the face 16 of the collar 14 is equipped with two notches 17, into which the lugs 35 of the levers 33 and 34 engage.

In order to introduce the shaft 12 of the tool holder 11 into the receiving bore 3 of tho machine spindle 2, it is first placed in front of the receiving bore 3 by the gripping device 21, attached to the disk 5 of the rotary tool magazine. The contact surface 23 is perpendicular to the axis of the receiving bore 3, resulting in the alignment of the tool holder 11 at least parallel to the axis of the receiving bore 3. The shaft 12 is then moved axially in the direction of the receiving bore 3. If the shaft is not centered, it will be moved in or out or sideways as soon as the beveled edge 13 of the shaft 12 rests against the beveled edge 4 of the receiving bore 3, and is thereby correctly aligned with the receiving bore 3. It may then be introduced, with little force and without canting, into the receiving bore 3 until it contacts the other collar 18 at the machine spindle 2 of the tool holder 11. Attached to the disk 5, there is an unlocking device 6, the actuating members of which engage in the notches 39 of the levers 33 and 34 and pivot the levers 33 and 34, as shown in the dash-dotted drawing in FIG. 1, thereby counteracting the tensional force of the springs 38. When the unlocking device is loosened the gripping device 21 releases the tool holder 11 inserted in the machine spindle 2.

Figure 3:
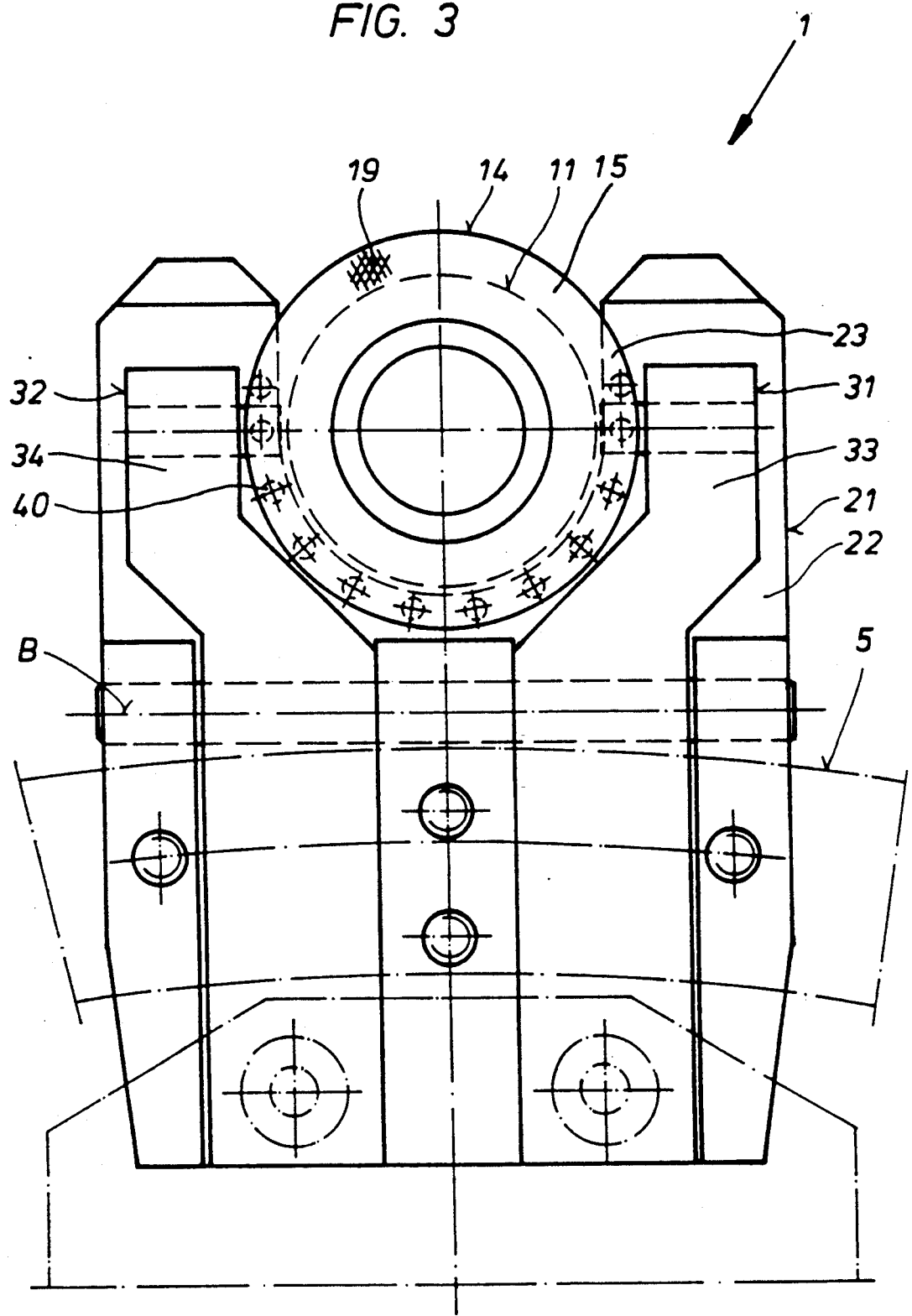
FIG. 3 shows a preferred embodiment of the apparatus according to FIG. 2.

To avoid friction during the alignment of the tool holder 11, the contact surface 15 of the collar 14 and/or the contact surface 23 of the contact plate 22 may be equipped with a friction reducing means, as shown in FIG. 3. The use of rolling devices, for example, roller balls 40, inserted into the contact surfaces 15 and/or 23, is also possible.

Figure 4:
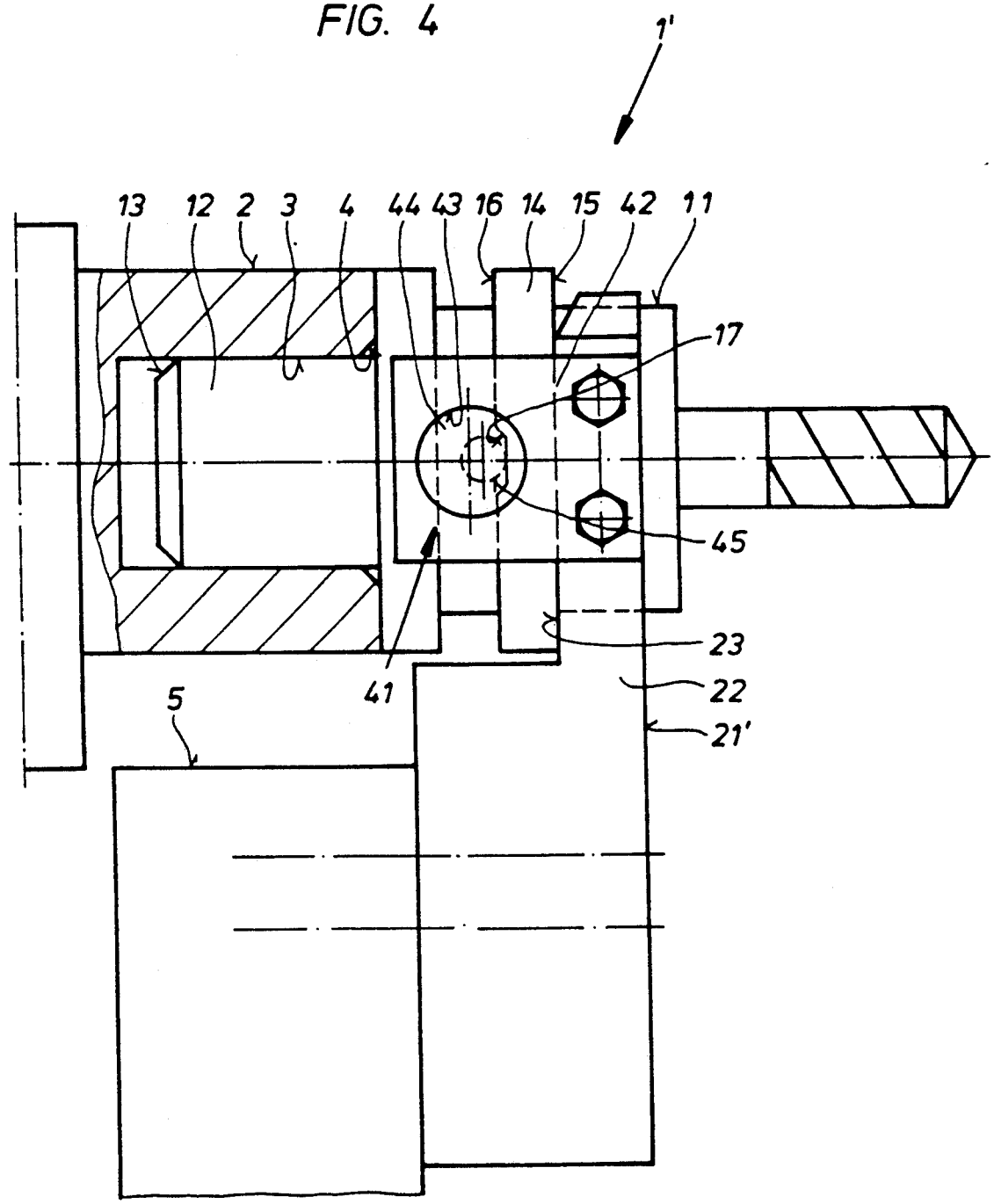
FIGS. 4-5 show the apparatus according to FIG. 1 with different clamp elements.

The gripping device 21', represented in FIG. 4, is equipped with the clamp devices 41, which consist of two disks 44. The lugs 45 are attached to the disks 44, eccentric to the rotation axis of the disks 44. The lugs 45 engage into the notches 17 of the collar 14 of the tool holder 11. The disks pivot in borings 43, which are formed into the plates 42 mounted to the contact plate 22. By manually or automatically rotating the disks 44, the tool workpiece holder 11 is pressed against the contact surface 23 of the contact plate 22, whereby the tool holder 11 may still be moved, to a limited extent, in the direction of the contact surface 23, that is, the connection between the workpiece holder 11 and the gripping device 21' is loosened.

Figure 5:
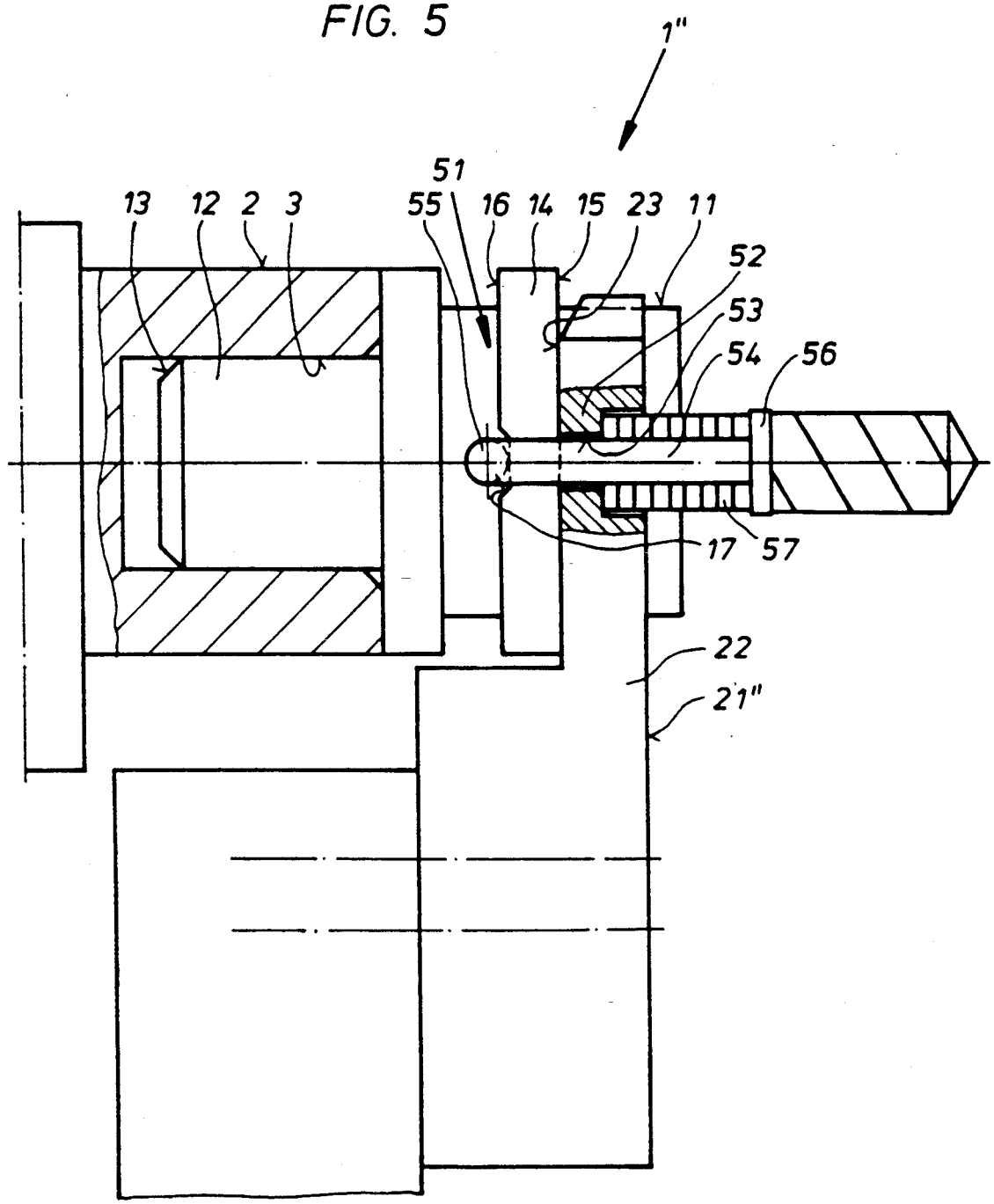

According to FIG. 5, the clamp devices 51 of the gripping device 21", which engage at the tool holder 11, comprise two tension bolts 54, which are mounted in the borings 53 of the lateral extensions 52 of the contact plate 22 in such a manner, that they may slide along their longitudinal axis. The ends of the tension or stay bolts 54, facing the face 16 are equipped with radially extending lugs 55, which engage at the notches 17 of the face 16, while the other ends of the bolts 54 are equipped with collars 56. A spring 57, supported by the contact plate 22, presses onto the collar 56. The tool holder 11 is pressed flush against the contact surface 23 of the contact plate 22 by tho force of the springs 57, thereby being clamped into the gripping device 21", but still slidable, to a limited extent, on the contact surface 23.

The present invention is, of course, in no way restricted to the specific disclosure of the specification, examples and drawings, but also encompasses any modifications within the scope of the appended claims.

What is claimed is:

1. An apparatus for the introduction of a cylindrical tool holder into a receiving bore, by using a feed gripping device, which holds said tool holder, said apparatus further comprising:

said gripping device comprising a contact plate and two clamp devices, which clamp devices partially embrace the sides of said tool holder and are movable in the axial direction of said tool holder in clamp said tool holder against said contact plate;

said contact plate and said tool holder, having respective contact surfaces that oppose each other and are perpendicular to the axis of the receiving bore; and said tool holder being held by said clamp devices in such a manner, that said tool holder is slidable, to a limited extent, in the direction of said contact surface of said contact plate.

2. An apparatus according to claim 1, in which said contact surface of said tool holder is built as an integral part of said tool holder in the form of a collar, with which collar said tool holder is clamped between said contact plate and said clamp devices of said gripping device.

3. An apparatus according to claim 2, in which the clamp devices are supported at a face of said collar, said face being opposite said contact surface of said collar, by lugs, which radially extend towards said tool holder.

4. An apparatus according to claim 3, in which, in order to assure that said tool holder is slidable, notches, which engage said lugs and are parallel to the axis of said lugs, are formed into said face of said collar, which face opposes the lugs.

5. An apparatus according to claim 3, in which said clamp devices of said gripping device comprise two levers, which pivot independently about a common bolt, guided in borings of said contact plate and borings of said clamp devices, with an axis of said bolt being perpendicular to the length of said levers.

6. An apparatus according to claim 5, in which, in order to clamp said tool holder, at least one respective tension spring is arranged between said contact plate and each of said levers of said clamp devices.

7. An apparatus according to claim 3, in which said clamp devices comprises two disks, which are arranged at opposite sides of said tool holder and are rotatable in said contact plate; and which disks, eccentric to a rotation axis of said disks, have attached to them one of said lugs, respectively, with said lugs interacting with said collar of said workpiece.

8. An apparatus according to claim 3, in which said clamp devices comprise two tension bolts, which tension bolts are arranged on opposite sides of said tool holder and are mounted to said contact plate such that they are slidable; and at least one spring, supported by said contact plate, is acting on said tension bolts, and to said tension bolts are attached said lugs, which are interacting with said collar of said tool holder.

9. An apparatus according to claim 1, in which said contact surface of said contact plate is equipped with a friction reducing means.

10. An apparatus according to claim 9, in which said friction reducing means is a rolling device, formed by rolling balls inserted into said contact surface of said contact plate.

11. An apparatus according to claim 1, in which said contact surface of said tool holder is equipped with a friction reducing means.

12. An apparatus according to claim 11, in which said friction reducing means is a rolling device, formed by rolling balls inserted into said contact surface of said tool holder.

* * * * *